United States Patent [19]
Matherne

[11] Patent Number: 6,032,851
[45] Date of Patent: Mar. 7, 2000

[54] VERTICAL PIPE COLUMN ASSEMBLY METHOD

[75] Inventor: Lee Matherne, Houston, Tex.

[73] Assignee: Premiere, Inc., New Iberia, La.

[21] Appl. No.: 08/734,087

[22] Filed: Oct. 21, 1996

[51] Int. Cl.$^7$ .................................................. B23K 31/02
[52] U.S. Cl. ........................... 228/104; 228/182; 228/227; 219/61
[58] Field of Search .................................. 228/104, 182, 228/227, 250, 49.3; 219/61

[56] References Cited

U.S. PATENT DOCUMENTS 4,176,269  11/1979  Merrick ...................................... 219/61

FOREIGN PATENT DOCUMENTS 61-253174  11/1986  Japan ........................................ 219/61
1-205892   8/1989   Japan ........................................ 228/227

*Primary Examiner*—Patrick Ryan
*Assistant Examiner*—Jeffrey T. Knapp
*Attorney, Agent, or Firm*—John D. Jeter

[57] ABSTRACT

A vertical pipe column assembly procedure involves the simultaneous welding and ultrasonic testing activity by using a plurality of welders progressing peripherally around a joint with the ultrasonic testing work similarly progressing peripherally around the joint between the welders. The temperature rise from welding activity is reduced by only partially completing the weld at a selected joint, then lowering the joint by the usual process of lowering or driving it downward one section length and completing the weld deposit at a lower work station. At the lower work station, ultrasonic testing again proceeds simultaneously between the peripherally progressing welders. An optional step used to improve joint strength, usable at selected joints needing the most strength, involves the application of an axial pull on the section above the finish welding activity. This axial pull places an axial stress in the partially completed weld. When the finishing weld metal cools it shrinks and is itself axially tension stressed. When the last weld metal applied cools, the axial pull on the pipe column is removed and the axially stressed weld is in a lower stressed state. By this external stress application process the outer weld metal places less compressive stress on the inner weld metal with a consequent reduction in the intrinsic stresses induced by the welding process. A stronger joint is the final product.

8 Claims, 2 Drawing Sheets

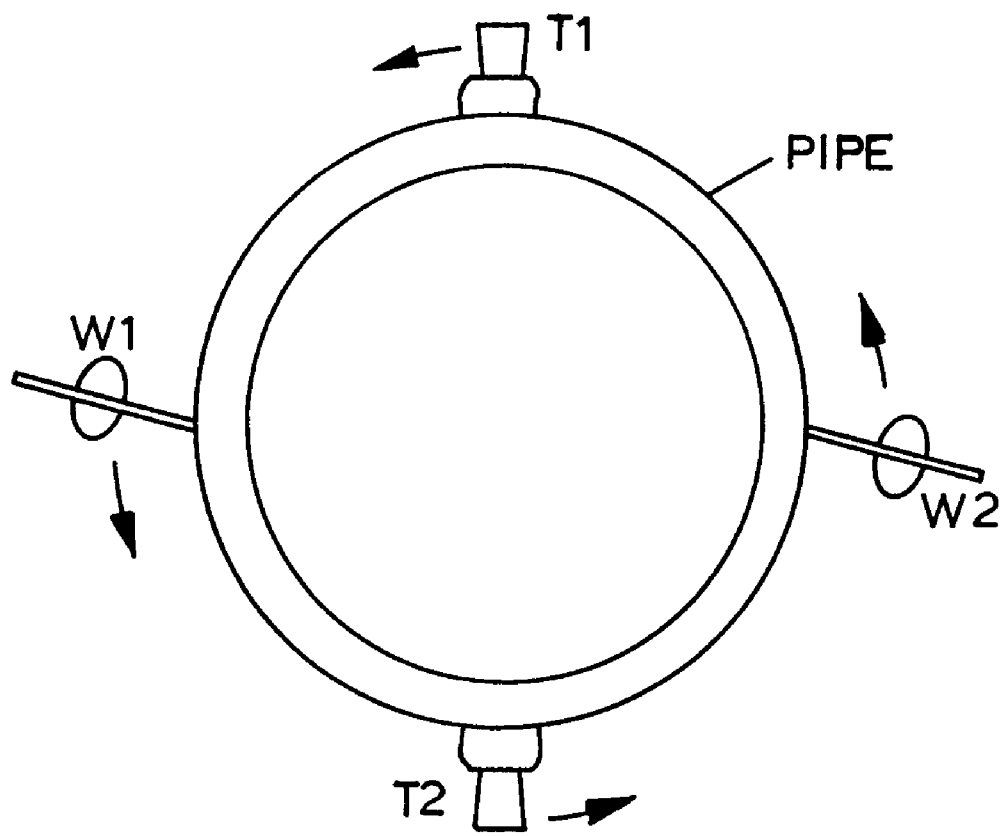

VERTICAL PIPE COLUMN ASSEMBLY METHOD

This invention pertains to methods for assembling vertical pipe sections into a pipe column primarily for, but not limited to, use as off shore support columns for structures that stand from the seabed and for conductor pipes and surface casings common to well drilling practices and the like.

BACKGROUND OF THE INVENTION

The assembly of large pipe columns from pipe sections less than fifty feet long is a well-established practice that is time consuming and costly. The installation time is inherently costly because massive hoisting gear, sometimes a drilling rig, is involved. If the work is being done off shore, floating platforms can add substantially to the time related cost.

The activity is permeated with massive machines and materials. Typically, the dimensions involved may include pipe diameter of two feet to ten feet with pipe wall thickness as much as three inches and an assembled length in the range of five hundred to fifteen hundred feet. Cost is already minimized in the design phase. The remaining cost reduction effort is directed to reduction of time involved in the assembly of the column. Four welders, or more, may be simultaneously involved in one joining weld. Each weld may be ultra sonically inspected in detail at least once on each joint. If flaws are found by testing, repair work disrupts the smoothest of routines.

Time saving efforts encounter some natural barriers to further improvement. Quite often, joining activities are suspended to allow dissipation of heat evolved from welding. If more welders are assigned to simultaneously work on a joint, the temperature of adjacent metal rises more rapidly. If certain temperature limits are reached, welding must be stopped to allow local material to cool and any potential time gain may be lost. Because ultra sonic testing for welding flaws must be done, the cool down period can be somewhat salvaged by testing during that otherwise wasted interval. Eliminating the cool down period appears to add the inevitable testing time to other parts of the time schedule.

The heat imposed by the welding process causes the temperature to rise in adjacent material at a rate somewhat inversely proportional to the weight of metal in the immediate vicinity and to the heat dissipating surface area near the welding activity. Those factors seem fixed and altering them is a challenge this invention addresses.

The weight of deposited weld metal is time related and the amount required is influenced by residual stress found in the outer peripheral surface of every weld. The last weld metal applied gets hotter than the first applied and the last applied shrinks more than the first applied. The resulting residual stress imbalance places tension stress on the outside surface of pipe being considered and places compression stress on the inside surface. Residual tension stress reduces the amount of imposed tension stress column bending can be allowed to add to a joint of specific physical dimension. Reducing the residual stress, hence, reduces the weight of weld metal required for a given joint strength and saves welding time.

It is therefore an object of this invention to generally double the heat dissipation surface of pipe adjacent to welding activity by separating the weld starting and weld completing activities by one pipe section length to avoid cool down delays.

It is another object of this invention to provide ultra sonic testing activity without delaying welding activity by placing testers between welders progressing peripherally around pipe being simultaneously welded and tested.

It is still another object of this invention to provide process steps to reduce the residual stress caused by welding to reduce the amount of weld metal required to produce a joint having specific strength.

These and other objects, advantages, and features of this invention will be apparent to those skilled in the art from a consideration of this specification, including the attached claims and appended drawings.

SUMMARY OF THE INVENTION

Pipe sections are joined to a vertical pipe column, at an upper work station, by welding with a first joining weld resulting in partial filling of the available joining bevels by at least two welders proceeding peripherally around the pipe during a welding session. To apply the outer passes of welds to complete the weld the pipe column is lowered one joint length. The required lowering of the column, usually by driving, provides a cooling period between welding sessions. Welders working at a lower work station then apply the last weld beads one section below a new joining weld being worked above. By distributing the work to both ends of a pipe section the heat dissipation area is essentially doubled. The greater heat dissipation area and the cooling interval during the build up of a weld allows more welders to work simultaneously without exceeding a preselected, welding induced, pipe wall temperature increase. Lowering the column is a necessary step when adding sections and using the time involved as a cool down period reduces the maximum temperature realized in the pipe wall, other factors being constant.

Ultrasonic testing, often conducted during a cool down period, may be conducted simultaneously with welding by placing a tester between the peripherally proceeding welders at either (or both) the upper or lower work stations.

As an optional step to reduce the compression of the inner weld metal by shrinking of the outer weld metal axial tension is applied to the pipe column during the application of the finishing weld material. A lifting force is applied above the weld being finished while welding proceeds. When the lifting force is removed, tension stress in the weld is reduced and the residual stress difference between inner weld metal and outer weld metal is reduced. A stronger weld results.

BRIEF DESCRIPTION OF DRAWINGS

In the drawings wherein like features have similar captions.

FIG. 10 is and elevation showing a collective procedure of the invention utilizing heating and non heating processes.

DETAILED DESCRIPTION OF DRAWINGS

Figure 1:
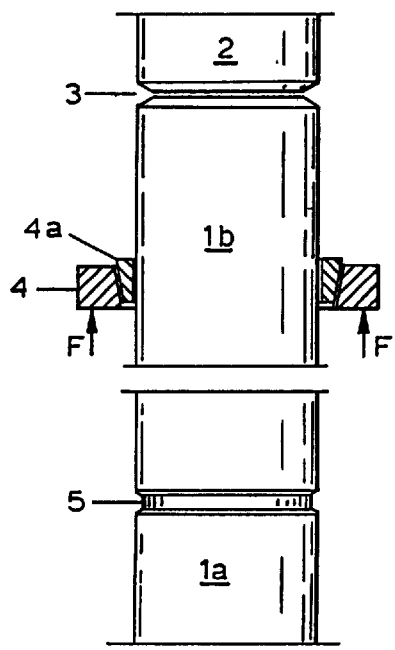
FIG. 1 is a side elevation of an early step in the procedures of the invention.

In the drawings, machinery and structures common to construction sites, well established in the art and not bearing upon points of novelty, are omitted in the interest of clarity and descriptive efficiency. Typical omissions include such as floating barges, drilling rigs, cranes, work platforms, and the like.

Figure 2:
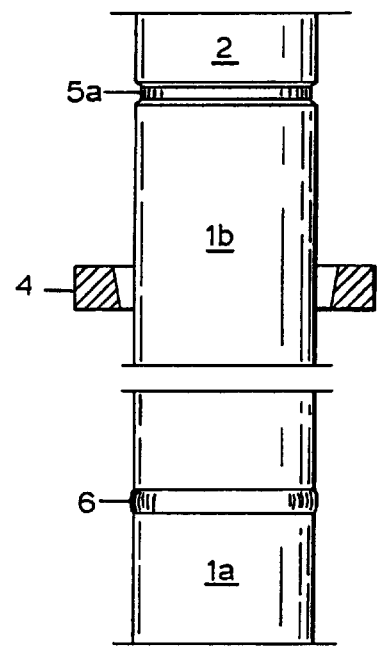
FIG. 2 is similar to FIG. 1 shown one step later in application of the procedures of this invention.

FIG. 1 represents the start of welding session at both upper and lower welds. FIG. 2 represents completion of both those sessions before moving the pipe column down one joint length. FIG. 1 shows two sections 1a and 1b of a pipe column joined by weld 5 that was partially completed at the upper position (see welding groove 3) before being driven down, or lowered, one section length. A third section 2 is positioned for application of the first weld passes in the groove 3 provided by pipe end bevels. Joint 1a is the top end of the pipe column already assembled. As an optional step a lifting collar 4, which may be a rotary table of a drilling rig, lifting eyes, or a peripheral lifting collar supported from any base, applies upward forces to section 1b to apply axial stress to the partly completed weld 5. The upward force is used for stability and handling in many common pipe handling actions. The purposeful stressing of the partial weld can be done after the lower portion of the assembled pipe column has been driven down so that the lifting force does not unseat the standing column. The lower end of the finished column does not need the maximum joint strength provided by the novel stressing steps. That need will usually exist above the middle of the assembled pipe column when it is finally in the intended service.

FIG. 2 shows the same general structure as FIG. 1. A completed weld now joins sections 1a, and 1b and the new section 2 has been aligned with and partially welded to section 1b with a weld of sufficient strength to accept the hammering of the column down one section length which will be followed by the previously described procedural steps. The lifting means F has been released from the pipe column to accept its downward movement and slips 4a are removed from collar 4. Salient features of this novel process involves welding the partial fill 5a at the same time full weld 6 is completed. After the condition of FIG. 2 is established, the pipe column is moved downward, by lowering or hammering, to again establish the FIG. 1 status in which case weld 5a becomes weld 5.

Figure 3:
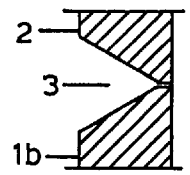
FIGS. 3, 4, and 5 are sections, rather enlarged, cut from the side wall of the pipe being assembled showing three principal phases in the procedures.
Figure 4:
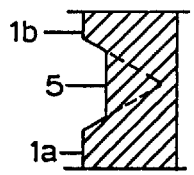
Figure 5:
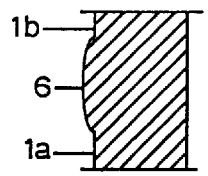

FIGS. 3, 4, and 5, rather enlarged, show a vertical section cut from the left side of the pipe circular form. FIG. 3 shows only the results of the alignment step conducted at the upper work station. FIG. 4 shows the partial weld deposit applied at the upper work station. FIG. 5 shows the finishing weld metal 6, applied over the preweld metal 5, at the lower work station.

Figure 6:
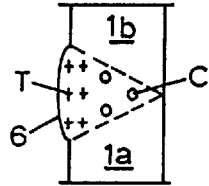
FIG. 6 is an outlines of a section similar to those of FIGS. 3–5 showing stress locations in the common, old art, weld joint.

FIG. 6 shows profiles of the same sections as FIG. 5. FIG. 6 illustrates the general distribution of stresses residual in the conventionally completed (old art) weld. Qualitatively, cross marks represent axial tension stress and circles represent axial compression stress.

Figure 7:
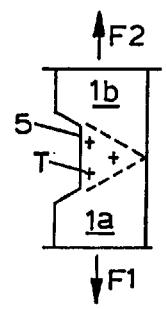
FIG. 7 is an outline of a section similar to that of FIG. 6 showing a significant novel step in the procedures of the invention.
Figure 8:
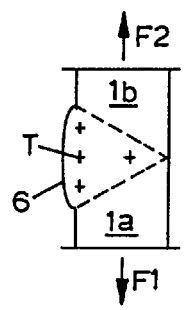
FIG. 8 is an outline of a section, similar to that of FIG. 6, showing a significant novel step in the procedures of the invention.
Figure 9:
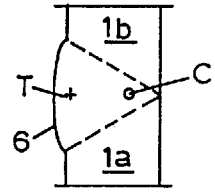
FIG. 9 is an outline of a section, similar to FIG. 8 showing the result of the use of applied stress during welding procedures.

FIG. 7 illustrates the novel step of applying axial tension stress to the inner weld metal 5 by applying axial lifting force F2 to the section above the joint being completed before adding weld metal. The pipe column is held down by force F1. When the outer weld deposit is made and the metal cools it will contain tension stress from shrinkage as shown in FIG. 8. Those stresses are normally supported by compression forces of the inner metal as shown in FIG. 6. When the lifting force F2 is removed as shown in FIG. 9, the stresses generally equalize toward a more even distribution of residual stresses within the deposited metal. Total relief of residual stress, however desirable, will not likely be achieved. The principal objective is to reduce the intrinsic tension stress near or at the outer surface of the deposited weld metal and that objective is achieved.

FIG. 10 shows the general nature of peripherally progressing actions carried out simultaneously. Ultrasonic test transducers T1 and T2 and welders W1 and W2 can be considered symbolic. Two welders are shown with one tester between each welder. The actual number of welders will usually be determined by peripheral space available. Big pipe allows more welders. Some practice may permit the use of two welders, or more, between each tester.

From the foregoing, it will be seen that this invention is one well adapted to attain all of the ends and objects hereinabove set forth, together with other advantages which are obvious and which are inherent to the tool.

It will be understood that certain features and sub-combinations are of utility and may be employed without reference to other features and sub-combinations. This is contemplated by and is within the scope of the claims.

As many possible embodiments may be made of the method of this invention without departing from the scope thereof, it is to be understood that all matter herein set forth or shown in the accompanying drawings is to be interpreted as illustrative and not in a limiting sense.

The invention having been described, I claim:

1. A method for increasing the heat dissipation area adjacent joining welds to reduce the temperature rise in adjacent pipe wall material when a preselected rate of weld material is deposited during the assembly of a series of pipe sections by welding end to end to assemble a vertical pipe column, the method comprising: welding both ends of a pipe section simultaneously to lay on about half of the weld metal required for each joint and moving said column down one section between welding sessions whereby a partly completed weld is one section length above a completed weld at the end of each said session.

2. A method for increasing the rate of application of weld metal in joints connecting a series of pipe sections end to end to progressively assemble a vertical pipe column subject to a preselected welding induced pipe wall temperature rise limit, the method comprising:

(a) increasing the heat dissipation area within a preselected distance from the welding activity by welding at both ends of each said section simultaneously;

(b) applying generally half of the weld metal required for each joint being welded at each welding session;

(c) adding one additional pipe section to said column between each said session; and (d) providing a weld cool down period by moving said column down one section length between each said session; whereby one half finished weld is always one section length above each last completed weld at the end of each said session.

3. The method of claim 2 wherein the residual stress variation between the first weld material deposited and the last weld material deposited is reduced by applying an axial tension force on the section above a weld joint being completed to reduce the amount of compression stress placed on said first deposited material by shrinkage of said last deposited material, after said force is removed.

4. The method of claim 2 wherein ultra sonic weld testing activity is carried out while weld material is being applied by placing at least one tester among the welders progressing peripherally around said joint.

5. A method for assembling additional pipe sections to a vertical pipe column, the method comprising:

(a) attaching the lower end of a vertical first additional pipe section to the top end of the column by applying a partial weld joining said section to the top end of the pipe column;

(b) moving the pipe column downward an amount generally equal to the length of said additional section;

(c) preparing a second additional vertical pipe section for welding its lower end to the top end of said first additional section (d) simultaneously welding at both ends of said first additional section to partially weld the top end of said first additional pipe section to the lower end of said second additional pipe section and adding weld material to said partial weld at the lower end of said first additional pipe section.

6. The method of claim 5 wherein said partially welding step at the top of said additional section comprises partially filling the periphery of an available groove provided by opposing bevels at the ends of both said pipe sections.

7. The method of claim 5 wherein at least one ultra sonic testing activity proceeds peripherally around said pipe between at least two welders working on at least one said joining welds.

8. The method of claim 5 wherein axial lifting force is applied to said additional pipe section while said weld at its lower end is being completed to a finished weld to place said first applied weld metal in tension to reduce the tension stress in the outer surface of the last applied weld metal when said axial lifting force is removed.

* * * * *